(12) United States Patent
Jiang et al.

(10) Patent No.: US 10,014,518 B2
(45) Date of Patent: Jul. 3, 2018

(54) CATHODE FORMED USING AQUEOUS SLURRY

(71) Applicant: Johnson Controls Technology Company, Holland, MI (US)

(72) Inventors: Junwei Jiang, Whitefish Bay, WI (US);
Yongkyu Son, Glendale, WI (US);
Bernhard M. Metz, Kelkeim (DE);
Patrick T. Hurley, Mequon, WI (US);
Qiang Luo, Milwaukee, WI (US); Kavi G. Loganathan, Glendale, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 106 days.

(21) Appl. No.: 14/057,939

(22) Filed: Oct. 18, 2013

(65) Prior Publication Data

US 2014/0186694 A1    Jul. 3, 2014

Related U.S. Application Data

(60) Provisional application No. 61/746,821, filed on Dec. 28, 2012.

(51) Int. Cl.
*H01M 4/131* (2010.01)
*H01M 4/1393* (2010.01)
(Continued)

(52) U.S. Cl.
CPC .......... *H01M 4/131* (2013.01); *B60L 11/123* (2013.01); *B60L 11/14* (2013.01); *B60L 11/18* (2013.01);
(Continued)

(58) Field of Classification Search
CPC .. H01M 4/131; H01M 4/1391; H01M 4/1393; H01M 4/0404
See application file for complete search history.

(56) References Cited

U.S. PATENT DOCUMENTS 5,543,249 A    8/1996  Takeuchi et al.
5,702,845 A    12/1997 Kawakami et al.
(Continued)

FOREIGN PATENT DOCUMENTS

JP    2000040504 A  *  2/2000  ............. H01M 4/02
WO   2012036260 A1    3/2012

OTHER PUBLICATIONS

Machine Translation of: JP 2000/040504 A, Yamaguchi et al., Feb. 8, 2000.*

(Continued)

*Primary Examiner* — Kenneth J Douyette
(74) *Attorney, Agent, or Firm* — Fletcher Yoder P.C.

(57) ABSTRACT

In one embodiment, a positive electrode is formed by a process that includes forming a slurry including particles dispersed within a liquid from a electrode formulation and the liquid such that the particles have a particle size distribution $D_{50}$ of 15 microns or less, coating the slurry on a collector; and drying the coated collector to form the positive electrode. The electrode formulation includes an electrode active material, a conductive carbon source, an organic polymeric binder, and a water-soluble polymer. The liquid consists essentially of water or a mixture of water and an alcohol. When the liquid consists essentially of the mixture, the alcohol is present in an amount of less than 10% by weight, based on the weight of the slurry. When the liquid consists essentially of water, the slurry is formed from the electrode formulation, the liquid, and an arene-capped polyoxoethylene surfactant.

18 Claims, 5 Drawing Sheets

(51) Int. Cl.
  *H01M 4/1391* (2010.01)
  *H01M 4/04* (2006.01)
  *H01M 4/505* (2010.01)
  *H01M 4/525* (2010.01)
  *H01M 4/62* (2006.01)
  *B60L 11/12* (2006.01)
  *B60L 11/14* (2006.01)
  *B60L 11/18* (2006.01)
  *H01M 10/0525* (2010.01)
  *H01M 10/052* (2010.01)

(52) U.S. Cl.
  CPC ....... *B60L 11/1861* (2013.01); *B60L 11/1864* (2013.01); *B60L 11/1874* (2013.01); *B60L 11/1877* (2013.01); *H01M 4/0404* (2013.01); *H01M 4/1391* (2013.01); *H01M 4/505* (2013.01); *H01M 4/525* (2013.01); *H01M 4/62* (2013.01); *H01M 4/622* (2013.01); *H01M 4/625* (2013.01); *H01M 10/0525* (2013.01); *B60L 2200/12* (2013.01); *B60L 2200/18* (2013.01); *B60L 2200/32* (2013.01); *B60L 2200/36* (2013.01); *B60L 2200/40* (2013.01); *B60L 2240/547* (2013.01); *B60L 2240/549* (2013.01); *H01M 10/052* (2013.01); *H01M 2220/20* (2013.01); *Y02E 60/122* (2013.01); *Y02T 10/6217* (2013.01); *Y02T 10/7011* (2013.01); *Y02T 10/7044* (2013.01); *Y02T 10/7061* (2013.01); *Y02T 10/7077* (2013.01); *Y10S 903/908* (2013.01)

(56) References Cited

U.S. PATENT DOCUMENTS

| | | | |
|---|---|---|---|
| 7,662,515 B2 | 2/2010 | Inagaki et al. | |
| 7,918,904 B2 | 4/2011 | Kono et al. | |
| 8,124,277 B2 | 2/2012 | Anada et al. | |
| 2004/0062982 A1* | 4/2004 | Takezawa | H01M 2/0267 429/130 |
| 2006/0286445 A1* | 12/2006 | Nishino | H01M 2/1653 429/120 |
| 2008/0124631 A1* | 5/2008 | Fukui | H01M 4/0404 429/217 |
| 2009/0212267 A1* | 8/2009 | Dobbs | H01M 4/136 252/521.2 |
| 2012/0107689 A1 | 5/2012 | Takahashi et al. | |
| 2012/0164537 A1* | 6/2012 | Aoyagi | C01G 31/00 429/231.5 |
| 2012/0237825 A1 | 9/2012 | Nakano | |
| 2013/0078365 A1 | 3/2013 | Mori et al. | |
| 2013/0164635 A1 | 6/2013 | Schmidt et al. | |

OTHER PUBLICATIONS

Zhang et al. Effect of Triton X-100 as Dispersant on Carbon Black for LiFePO4 Cathode. International Journal of Electrochemical Science, 8 (2013) 6722-6733.

K. Zaghib et al.; "Safe and fast-charging Li-ion battery with long shelf life for power applications," Jornal of Power Sources, vol. 196, No. 8, Nov. 17, 2010; pp. 3949-3954.

W. Porcher et al.; "Optimizing the surfactant for the aqueous processing of LiFePO4 composite electrodes," Journal of Power Sources, vol. 195, No. 9, May 1, 2010; pp. 2835-2843.

International Search Report and Written Opinion for PCT Application No. PCT/US2013/065976 dated Feb. 5, 2014; 12 pgs.

CN 201380067779.2 Office Action dated May 19, 2016.

* cited by examiner

CATHODE FORMED USING AQUEOUS SLURRY

CROSS-REFERENCE TO RELATED APPLICATIONS

This application claims priority from and the benefit of U.S. Provisional Patent Application No. 61/746,821 entitled "CATHODE SLURRY WITH WATER-BASED BINDER WITH LITTLE OR NO PARTICLE AGGLOMERATION," filed on Dec. 28, 2012, which is hereby incorporated by reference in its entirety for all purposes.

BACKGROUND

The present disclosure relates generally to the field of batteries and battery modules. More specifically, the present disclosure relates to battery cells that may be used in vehicular contexts (e.g., xEVs), as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12 volt systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of PHEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery modules. More specifically, the present disclosure relates to lithium ion battery cells that may be used in vehicular contexts (e.g., xEVs) as well as other energy storage/expending applications (e.g., energy storage for an electrical grid).

For example, the present disclosure includes methods for producing a positive electrode that may be incorporated into a battery module for use in an xEV. The methods may generally include forming a slurry of particles dispersed within a liquid from an electrode formulation and the liquid. In some embodiments, the liquid may consist essentially of water, while in other embodiments, the liquid may be a mixture that consists essentially of water and one or more alcohols. In embodiments where the liquid consists essentially of water, a surfactant, such as an arene-capped polyoxyethylene surfactant, may be used.

The slurry may be coated onto a collector, and dried to form a positive electrode. The performance of the positive electrode may be enhanced relative to electrodes produced by methods where no surfactant or no alcohol is used by reducing or altogether eliminating particle agglomeration. Mitigating this agglomeration enables the stabilization of smaller particle sizes in the slurry, which in turn enhances various physical properties of the positive electrode. For example, the particle size distribution of the slurry solids, $D_{50}$, may be 15 microns or less, meaning that 50% of the particles of the slurry have a diameter of 15 microns or less. For example, the particle size distribution $D_{50}$ may be approximately 15 microns or less, approximately 14 microns or less, approximately 13 microns or less, approximately 12 microns or less, approximately 11 microns or less, or approximately 10 microns or less.

In some embodiments, the electrode formulation includes an electrode active material, a conductive carbon source, an organic polymeric binder, and a water-soluble polymer. In still further embodiments, the electrode formulation may consist essentially of these materials, such that a cathode slurry composition includes the electrode formulation materials, the liquid and, in some embodiments, a surfactant.

The present disclosure also includes secondary lithium ion batteries incorporating, among other things, positive electrodes produced in accordance with embodiments of the present technique. The secondary lithium ion batteries may display enhanced performance relative to other secondary lithium ion batteries incorporating positive electrodes produced using traditional methods, such as n-methylpyrrolidone (NMP)-water slurry preparation methods that do not use a surfactant or an alcohol. For example, secondary lithium ion batteries incorporating the positive electrodes of the present disclosure may retain at least 50% of their capacity at a 10C discharge rate.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The term "consisting of," when used in the context of a mixture of materials, is intended to be defined as limiting the recited components to those specifically recited, except for impurities ordinarily associated with the recited materials. The term "consisting essentially of" is intended to be defined as being limited to the specified materials or steps that do not materially affect the basic and novel approaches described herein. Additionally, it should be understood that references to "one embodiment" or "an embodiment" of the present disclosure are not intended to be interpreted as excluding the existence of additional embodiments that also incorporate the recited features.

When the term "approximately" is associated with a value, such as a measurement or a percentage, this term is intended to denote the standard deviation resulting from manufacturing and measurement tolerances, such that an approximate value takes into account the standard uncertainty associated with the particular measurement used to determine the value and standard manufacturing tolerances used to produce the value. Furthermore, the disclosure of approximate values and percentages below is also intended to encompass the disclosed value. For example, "approximately 10%" is also intended to disclose 10%, and "approximately 10 microns" is also intended to disclose 10 microns.

As mentioned, battery systems may be used to provide power to a number of different types of xEV's as well as other energy storage applications (e.g., electrical grid power storage systems). Such battery systems may include a number of battery modules, each battery module having a number of battery cells (e.g., electrochemical cells). Generally, the battery cells will include a cathode (i.e., a positive electrode), an anode (i.e., a negative electrode), and an electrolyte that provides a source of ions (e.g., lithium ions). In accordance with the present disclosure, the cathode and anode each include an electrode active material that enables the electrodes to store and transfer ions (e.g., lithium ions) during charging and discharging cycles. Whether the electrode is a cathode or an anode is generally determined by the electrode active material for each. Thus, the electrode active materials will generally be different.

As one example, secondary lithium ion batteries may be utilized for powering all or a portion of an xEV or another power-consuming device. Such batteries are generally considered to include electrochemical cells that utilize lithium ions to shuttle electrons between the anode and cathode, and are rechargeable (i.e., the electrochemical reaction used to generate power is reversible). Secondary lithium ion batteries can be employed in a variety of devices in addition to xEV's, such as personal electronic devices (e.g., laptop computers and cellular telephones), and even space shuttles. Because of the various implementations associated with these types of batteries, and the corresponding variety in power requirements, it may be desirable to use any of a wide variety of materials for the active components of these batteries. For example, materials with specific properties may be selected from a wide variety of materials can be used to produce the anode, cathode, and electrolyte of a secondary lithium ion battery, depending on the particular power requirements that the battery will be intended to meet.

Generally speaking, the power characteristics (e.g., power retention, cycle life, and so forth) of each battery cell may depend, at least in part, on various parameters of the cathode active material. Example parameters of the cathode active material that can affect the power characteristics include the chemical composition of the cathode active material, as well as the physical properties of the cathode (e.g., the porosity and surface roughness of the cathode active material when coated onto an electrode). For instance, the chemical composition of the cathode active material may be considered to affect the cathode's ability to undergo a particular electrochemical transformation, while the physical properties of the cathode active material may be considered to affect the cathode's ability to intercalate (incorporate) and deintercalate (lose) lithium ions, which in turn can affect lithium ion availability for the electrochemical transformation.

These parameters will generally determine the overall suitability of the cathode active material for the conditions under which the battery cell is placed during the normal course of operation. For example, certain cathode active materials may be suitable for incorporation into battery cells operating at 3 Volts (V), but may be inadequate for other implementations, such as battery cell operation at closer to 4 V. The nominal voltage, average voltage determined using standard testing conditions, and/or charge limit (i.e., peak charge voltage) of a battery cell produced using particular types of cathode active materials will generally be good indicators as to whether the cathode active material might be suitable for a particular operational voltage.

For certain implementations discussed herein, such as when the battery system is to be utilized in a vehicular context (e.g., an xEV such as a PEV, HEV, or mHEV), it may be desirable to utilize cathode active materials having a nominal voltage of at least 3.0 V. In vehicular contexts, the weight of the battery system will generally affect the efficiency of the xEV, since the battery will generally provide power that is, in some form, used to facilitate motion of the xEV. Accordingly, it may be desirable to use cathode active materials having higher nominal voltages (e.g., 4 V or more) to reduce weight (e.g., by reducing the number of cells needed to meet a particular voltage rating) while also enabling operation at a relatively high voltage (e.g., 48 V in some contexts).

The cathode of an electrochemical cell, for example a secondary lithium ion battery, may be produced by a variety of methods. In accordance with the techniques of the present disclosure, the cathode portion is a coated positive electrode. The coating is produced by a method in which a slurry of the cathode active material (in combination with other components) in a liquid is formed. The slurry, which may have a viscosity similar to a paste, may then be used to coat a metallic collector (e.g., aluminum, stainless steel, nickel), often referred to as a foil. The coated collector may then be dried to remove the liquid, resulting in the coated electrode (e.g., a positive electrode).

In typical approaches, a common liquid used for this process (e.g., to form the slurry) is a mixture of water and n-methylpyrrolidone (NMP), or water and similar solvents (e.g., lactam-based solvents). NMP and similar solvents are excellent solvents that enable very good dispersion of the cathode active material in the slurry, which ultimately produces cathodes having relatively higher performance compared to when they are not used. Unfortunately, NMP and similar solvents are generally considered to be undesirable from a cost and process standpoint, among others. For example, NMP is significantly more expensive than water, and processes employing these types of solvents often involve various solvent recycling procedures, which can increase the capital cost and decrease the throughput associated with the production of electrodes.

Anodes used in battery systems, such as secondary lithium ion batteries, can be formed from a variety of anode active materials, with graphitic carbon being one example. In a general sense, anode active materials can be coated onto a collector to form a coated anode using a slurry approach similar to that noted above with respect to the cathode, using only water (i.e., no NMP-like solvents), with relatively good success and acceptable performance for a wide variety of applications. Unfortunately, the success of water-only slurries (i.e., the replacement of a water-NMP liquid system with an all-water liquid system) in anode production does not necessarily translate to processes involving cathode active materials.

For example, as noted above, the performance of a given battery is dependent on various chemical and physical parameters of the cathode active material. As the nominal voltage of a battery cell produced using a cathode active materials increases, it becomes increasingly difficult to obtain acceptable battery performance when the slurry is produced using only water as the liquid for a variety of reasons. For instance, it is presently recognized that as cathode active materials that produce electrochemical cells with relatively higher voltages (e.g., nominal voltage, peak charge voltage, average voltage) are used, particle agglomeration during slurry formation becomes increasingly problematic, especially in water. It is believed that this is due to the entrapment or similar association of water within the agglomerate, such that even after a drying process, residual water may still remain. This water can have an extremely deleterious effect on the electrochemical processes that take place at the cathode, especially at higher voltages, which in turn decreases battery performance. Accordingly, it is presently recognized that it may be desirable to mitigate particle agglomeration during slurry formation, especially for cathode active materials that produce electrochemical cells having voltages (e.g., peak charge voltage, nominal voltage, average operating voltage) higher than about 3.5 V, since such materials are generally much more sensitive to the presence of water than materials that produce cells with lower voltages (e.g., 3.3 V and below).

The present inventors have also identified that it may be desirable to maintain the particle size distribution of the slurry solids at or below a particular size in order to obtain desirable cathode (and associated battery) performance. The present disclosure addresses these and other issues using an approach wherein during formation of the cathode, a slurry is produced using only water, in combination with an additive that stabilizes smaller particle sizes (e.g., less than about 15 microns). The present disclosure also addresses these and other issues using an approach wherein the slurry is produced using a combination of water and a relatively small amount of an alcohol, such as methanol, ethanol, or propanol (e.g., 1-propanol). As discussed in detail below, these approaches also provide what are believed to be surprising results in that cathodes produced according to the present technique may display better overall performance, even when compared to industry-standard processes that utilize water-NMP solvent mixtures. Accordingly, not only do the present techniques enable the elimination of undesirable solvents, but also enable the production of cathodes having superior performance.

Figure 1:
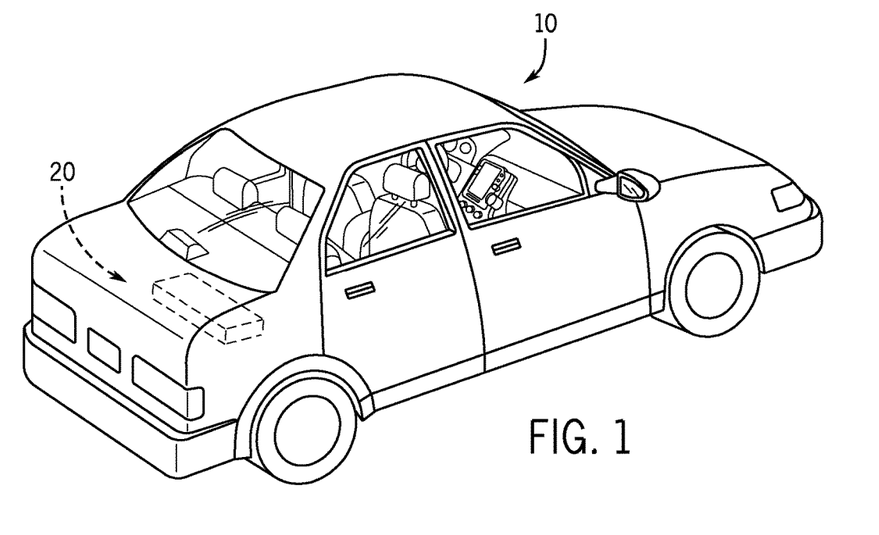
FIG. 1 is a perspective view of a vehicle (an xEV) having a battery system contributing all or a portion of the power for the vehicle, in accordance with an embodiment of the present approach.

Again, the present approaches may be applied to cathode active materials used in any type of battery, but may be particularly useful for battery systems utilized to provide power in an xEV. With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 20 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
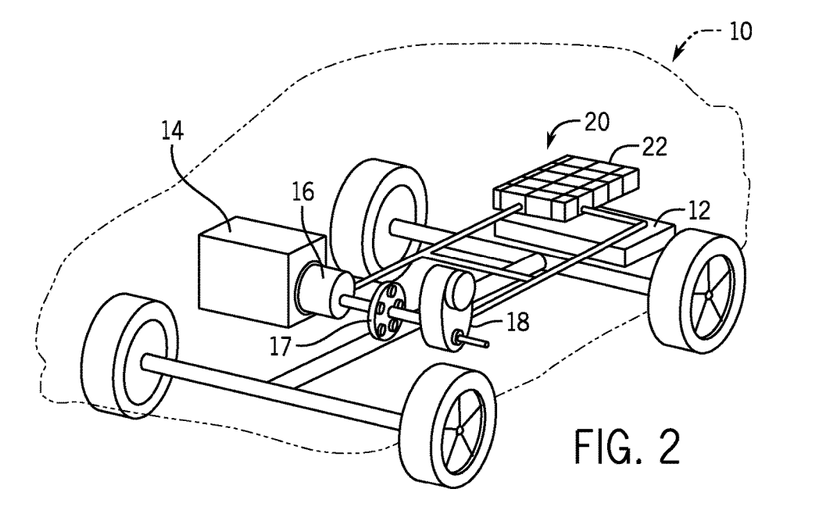
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an internal combustion engine 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered as limiting the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Again, the battery system 20 may include multiple battery modules 22, wherein the battery modules include an electrochemical cell (e.g., a lithium ion electrochemical cell). In accordance with the present disclosure, the battery modules 22 may include a secondary lithium ion battery having, among other things, a cathode (i.e., a positive electrode), an anode (i.e., a negative electrode), and an electrolyte comprising a source of lithium ions dissolved within a solvent mixture. Generally, the solvent mixture includes one or more polar aprotic solvents capable of causing the lithium ion source to dissociate. The positive and negative electrodes are, in some embodiments, coated electrodes in which an active material is coated onto a conductive collector material (e.g., aluminum, stainless steel, nickel).

As will be appreciated by those of skill in the art, an electrochemical half-reaction occurs at each of the positive and negative electrodes. For example, the electrochemical half-reaction at the positive electrode may be a reaction in which one or more lithium ions are reversibly (based on an equilibrium) dissociated from the positive electrode active material, thereby also releasing one or more electrons (equal in number to the number of dissociated lithium ions). At the negative electrode, the electrochemical half-reaction that occurs may be a reaction in which one or more lithium ions and one or more electrons (of equal number) are reversibly associated with the negative electrode active material (e.g., carbon). During discharging of the battery, the equilibria at the electrodes favor dissociation of the lithium ions and electrons from the negative electrode active material and re-association of the electrons and lithium ions with the positive electrode active material. On the other hand, during charging, the reverse is true. The movement of the ions into the electrodes is commonly referred to as intercalation or insertion, and the movement of the ions away from the electrodes is commonly referred to as deintercalation or extraction. Accordingly, during discharging, intercalation occurs at the positive electrode and deintercalation occurs at the negative electrode, and during charging, the reverse is true. Therefore, the positive and negative electrodes of the present batteries will generally be capable of lithium ion intercalation and deintercalation.

The discussion below will first introduce the present approaches for producing positive electrodes, and will subsequently discuss example components that may be used to form an electrochemical cell incorporating the positive electrodes of the present disclosure, including example negative electrodes, and example electrolyte solutions. Battery performance data is also presented below, which shows the enhanced performance achieved when using electrodes produced in accordance with the present techniques.

In accordance with present embodiments, the positive and negative electrodes may be produced according to a slurry method in which a slurry including the electrode active material and a liquid is prepared, followed by coating the slurry onto a collector. The collector is then dried to produce a coated electrode.

The slurry is first mixed thoroughly, followed by coating according to any suitable method. Example methods of coating include knife coating, notched bar coating, dip coating, spray coating, electrospray coating, or gravure coating. The drying of the coated collector may be performed in any suitable manner to produce the coated electrode, for example by drying in an oven at an elevated temperature (e.g., above about 70° C.) for a certain period of time (e.g., between about 20 minutes and an hour).

The slurry may be formed from an electrode formulation and a liquid, which may be a single liquid (e.g., water) or may be a mixture of liquids (e.g., water in combination with a polar protic solvent such as an alcohol). Components of the electrode formulation, which are discussed below, may be mixed altogether into the liquid, or may be individually dissolved or dispersed within a liquid before being brought together with the other components. The components of the electrode formulation may include, but are not limited to, the positive electrode active material (which may be a single electrode active material such as NMC, or a mixture of electrode active materials such as NMC and another material), at least one conductivity enhancer, at least one binder, and at least one viscosity enhancer. Other additives, which are not considered to be a part of the electrode formulation but are otherwise added to the slurry, may be provided to enable the slurry to have a desired particle size distribution. One example of such an additive is a surfactant.

Positive Electrode Active Material

The at least one positive electrode active material will generally include any active material capable of undergoing the reversible process described above with respect to the positive electrode. In accordance with present embodiments, the positive electrode active material may be an active material that generates a high voltage cathode (4 V or higher) when used in accordance with the present approaches. By way of example, the positive electrode active material may be a lithium metal oxide (LMO) component. As used herein, lithium metal oxides (LMOs) may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_{1/3}Co_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$). Again, the at least one positive electrode material may include only a single active material (NMC), or may include a mixture of materials such as any one or a combination of: NMC, NCA, LCO, LMO-spinel, and the like.

It should be noted that the present approaches may also be applicable to other types of positive electrode active materials, such as lithium metal phosphate electrode active materials. However, such materials are generally not as sensitive to the presence of water during preparation. Indeed, such lithium metal phosphate materials may generally not be considered to be high voltage cathode materials, as they typically have an average voltage lower than 4 V (e.g., about 3-3.5 V).

Generally, the positive electrode active material may be present in an amount between approximately 90% by weight and 99% by weight, based on the weight of the electrode formulation. More specifically, the positive electrode active material may be present in an amount between approximately 91% by weight and approximately 98% by weight, between approximately 92% by weight and approximately 96% by weight, between approximately 93% by weight and 95% by weight, or between approximately 93.5% by weight and 94.5% by weight, based on the total weight of solids used to form the slurry. In one embodiment, the positive electrode active material may be present in an amount of approximately 94.0% by weight, based on the total weight of solids used to form the slurry.

Conductivity Enhancer

In certain embodiments, although the positive electrode active material readily undergoes the electrochemical reaction noted above at its particular ionization potential, it is oftentimes not electrically conductive enough to enable conduction from the active material to the collector so as to enable the battery to be charged or discharged at a high rate. Accordingly, a conductivity enhancer may be provided as one of the plurality of components used to form the slurry. The conductivity enhancer may be referred to as a conductive diluent, conductive carbon, or the like. Such conductivity enhancers may include, but are not limited to, carbon (e.g., carbon black, flake graphite, and the like), metal, metal nitrides, metal carbides, metal suicides, and metal borides. Example carbon blacks may include acetylene black, furnace black, lamp black, graphite, carbon fibers, or any combination thereof.

The conductivity enhancer (e.g., conductive carbon source) may be present in any suitable amount. By way of example, for lithium-nickel-manganese-cobalt composite oxide electrodes, the conductivity enhancer may be present in an amount ranging from 0% by weight to approximately 10% by weight, such as between approximately 0.5% by weight to approximately 8% by weight, between approximately 2% by weight to approximately 6% by weight, or between approximately 3% by weight to approximately 5% by weight, based on the weight of the solids in the slurry. In some embodiments, the conductivity enhancer may be present, but in an amount less than 10% by weight, less than 8% by weight, less than 6% by weight, or less than 4% by weight, based on the weight of the solids in the slurry.

Polymeric Binder

As may be appreciated, the materials used to construct the positive electrode, though they are coated onto the collector together, may not necessarily maintain a continuous structure. Accordingly, the plurality of components may include a polymeric binder that keeps the electrode together. Example binders may include polymers, copolymers (e.g., block copolymers, terpolymers, and so forth). For example, organic polymers may include polyolefins (e.g., polyethylene, polypropylene, polybutylene polymers), fluorinated polymers (e.g., prepared from fluorine-containing monomers), polymers or copolymers prepared from conjugated dienes, vinylarenes, acrylates, acrylonitriles, acrylamides, or any combination thereof. By way of further example, the polymeric binder may include a monovinylarene-conjugated diene copolymer rubber, such as a styrene-butadiene rubber (SBR), and derivatives thereof.

The polymeric binder may be present in any suitable amount. By way of example, for lithium-nickel-manganese-cobalt composite oxide electrodes, the polymeric binder may be present in an amount ranging from 0% by weight and approximately 5% by weight, such as between approximately 0.1% by weight and approximately 4% by weight, between approximately 0.5% by weight and approximately 3% by weight, or between approximately 1.0% by weight and approximately 1.5% by weight.

Viscosity Enhancer

The materials discussed above will, in general, not dissolve in the liquid of the present embodiments (e.g., water or water/alcohol mixture). This is one reason that the plurality of components form a slurry. To enhance the ability of the positive electrode active material, the conductivity enhancer, and the polymeric binder to form a coating on the collector, the plurality of components may also include a viscosity enhancer. In some embodiments, the viscosity enhancer may include a water-soluble polymer capable of increasing the viscosity of the slurry. By way of example, the viscosity of the slurry may be increased such that the slurry has a paste-like consistency.

The viscosity enhancer may be any suitable water-soluble polymeric material that enables viscosity to be increased without deleteriously affecting the performance of the battery. For example, the viscosity enhancer may be a cellulose derivative, such as carboxylated celluloses, alkylated celluloses, hydroxy alkylated celluloses, or any combination thereof. By way of specific examples, the viscosity enhancer may include carboxymethylcellulose (CMC), methylcellulose, ethylcellulose, hydroxymethylcellulose, hydroxlethylcellulose, hydroxypropyl cellulose, hydroxyethyl methyl cellulose, and the like. In other embodiments, the viscosity enhancer may include polycarboxylic acids, polyacrylamides, polyvinylpyrrolidones, polyethylene oxides, gums (e.g., xanthene gums, carrageenan, guar gum), agar, or starch.

The viscosity enhancer may be present in any amount appropriate for obtaining a desired viscosity for the slurry. By way of example, the viscosity enhancer may be present in an amount ranging from 0.1% by weight to approximately 5% by weight, such as between approximately 0.3% by weight and approximately 3% by weight, between approximately 0.4% by weight and approximately 2% by weight, or between approximately 0.5% by weight and approximately 1.0% by weight, based on the weight of the slurry solids.

Surfactants

In accordance with certain of the present embodiments, one or more surfactants may be provided to the slurry in order to prevent agglomeration of the solids of the slurry. The surfactants, generally, may be any suitable type that enables the prevention of agglomeration. However, the inventors have recognized that for NMC active materials, particular types of surfactants may provide enhanced agglomeration mitigation, and, in some instances, better battery performance than the performance that would be obtained using industry-standard techniques employing water/NMP (or the like) liquid mixtures. Specifically, the inventors have recognized that for NMC active materials, arene-capped polyoxoethylenes tend to provide good agglomeration attenuation, where certain types of these arene-capped polyoxoethylenes provide enhanced cathode performance.

By way of example, the surfactant may include (only or in addition to other surfactants) a compound having the general formula Ar—O($C_2H_4O)_n$, wherein Ar is an aromatic group or a substituted aromatic group and n is an integer greater than 4, such as 9 or 10. Ar may be any type of aromatic group capable of interacting with any one or a combination of the solid components of the slurry, and, in one embodiment, may play a role in stabilizing particle sizes smaller than about 20 microns within the slurry. By way of non-limiting example, Ar may include, for example, phenyl, naphthyl, anthracenyl, and the like. Substituted derivatives of these compounds are also included, wherein each group may have from 4 to about 25 carbons. Such substituted derivatives may include, for example, tolyl, xylyl, mesityl, and the like, including any heteroatom substituted derivatives thereof. Heteroaromatic compounds may be used as well.

The aromatic group may also include one or more substituents, such that when the surfactant is an arene-capped polyoxoethylene, it has the general formula:

wherein $R^1$ is an alkyl group having between 1 and 14 carbons and n is an integer greater than 4 (e.g., between 4 and 12, such as 9 or 10). By way of example, $R^1$ may be an aliphatic group, for example, an alkyl group (including straight chain and branched derivatives), a cycloalkyl group, and the like. In one particular embodiment, the surfactant may have the formula:

wherein n is an integer greater than 4, such as 9 or 10. One example of this surfactant is commercially available as TRITON™ X-100 arene-capped polyoxoethylene surfactant, available from The Dow Chemical Company of Midland, Mich. It should be noted that in embodiments where the positive electrode active material is NMC, the above surfactant may reduce or altogether eliminate agglomeration such that the particle size distribution of the particles formed in the slurry is substantially the same as or within a particular percentage of the particle size distribution of the dry NMC powder. Example particle size distributions are discussed in further detail below.

The surfactant may be present in any suitable amount to substantially reduce or altogether prevent particle agglomeration within the slurry. By way of example, the surfactant (e.g., arene-capped polyoxoethylene surfactant) is present in an amount of between approximately 0.05% by weight and approximately 5.0% by weight, based on the weight of the slurry. For example, in embodiments where the surfactant is an arene-capped polyoxoethylene surfactant, the surfactant may be present in an amount between approximately 0.05% by weight and approximately 1.0% by weight, such as between approximately 0.05% by weight and approximately 0.5% by weight, based on the weight of the slurry. The inventors have also found that it may be desirable to maintain the amount of arene-capped polyoxoethylene surfactant below approximately 0.5% by weight in order to prevent bubble formation, or the formation of other deformations or irregularities. Indeed, it may be desirable to prevent bubble formation and other deformations or irregularities in order to provide a smooth coating on the collector during electrode formation. Again, the roughness of the coating may affect the battery properties and, therefore, preventing bubbling may correspondingly prevent a reduction in battery performance. Thus, in some embodiments, the arene-capped polyoxoethylene surfactant may be present in an amount of less than 0.5% by weight, such as between approximately 0.05% by weight and approximately 0.4% by weight, between approximately 0.05% by weight and approximately 0.3% by weight, between approximately 0.05% by weight and approximately 0.2% by weight, or between approximately 0.05% by weight and approximately 0.1% by weight, based on the weight of the slurry.

Other Additives

The electrode slurry compositions may, in some embodiments, include additional additive materials such as an adhesion promoter, as well as other additives known to those of skill in the art. Adhesion promoters may be desirable to promote adhesion of the electrode active material and/or the conductivity enhancer to the polymeric binder. The combination of an adhesion promoter and polymeric binder may, in some embodiments, help the electrode active material, after coating onto the collector to form an electrode, better accommodate volume changes that can occur during repeated lithium intercalation and deintercalation occurring during discharging and charging, respectively, at the positive electrode. However, in some embodiments, the polymeric binder may offer sufficiently good adhesion to metals and alloys (e.g., the collector) so that addition of an adhesion promoter may not be needed. For example, the use of SBR as a polymeric binder, and similar monovinylarene-conjugated diene rubbers, will generally provide sufficient adhesion for NMC electrode materials.

The adhesion promoter can be introduced as a separate agent to the electrode slurry, may be made a part of the polymeric binder (e.g., in the form of an added functional group), can be a coating on the powdered electrode active material, can be added to the conductivity enhancer, or any combination thereof. Non-limiting examples of useful adhesion promoters include silanes, titanates, and phosphonates.

Liquids

The liquid of the slurry, in accordance with present embodiments, will always include water. For example, the liquid may be only water (i.e., approximately 100% of the liquid of the slurry is water) or a mixture of water and a polar protic solvent. That is, the liquid of the slurry may only include water, or may include a mixture consisting essentially of water and one or more polar protic solvents. The one or more polar protic solvents, in accordance with present embodiments, will generally be alcohols having between 1 and 10 carbons, such as between 1 and 8 carbons, between 1 and 6 carbons, between 1 and 4 carbons, or 1, 2, 3, or 4 carbons. As a non-limiting example, the alcohols may be terminal alcohols, secondary alcohols, or tertiary alcohols. Example alcohols used in accordance with present embodiments include, but are not limited to: methanol, ethanol, 1-propanol (i.e., n-propanol), 2-propanol (i.e., isopropanol, isopropyl alcohol), 1-butanol (i.e., n-butanol), 2-butanol, isobutanol (i.e., sec-butanol), t-butanol (i.e., tertiary butyl alcohol), and the like, and combinations thereof. Thus, in some embodiments, the liquid may consist essentially of, or consist of, water and one or more alcohols.

While the alcohols may generally include any one or a combination of the alcohols set forth above, the inventors have found that for NMC-containing slurries, 1-propanol (i.e., n-propanol) provides excellent particle agglomeration mitigation, and actually enhances positive electrode performance. Example data is provided below. While the specific superiority of 1-propanol is not currently understood to its full extent, it is believed that the 1-propanol both reduces the surface tension of water, and also is capable of forming a stable micelle structure on the surface of the slurry solids. Indeed, 1-propanol was found to be superior to 2-propanol (isopropanol) when considering both particle size distribution and battery performance, indicating that steric hindrance may play a role in small particle stabilization. That is, the 1-propanol may engage in a greater amount of van der Waals interactions between the alcohol molecules, while the steric hindrance caused by the branched nature of 2-propanol may not engage in such interactions to the same degree. Furthermore, 1-propanol may also serve to facilitate the removal of water from the electrode active material during the drying of the coated collector. In this way, residual water in the positive electrode may be reduced.

Indeed, the inventors have found that 1-propanol is effective at preventing particle agglomeration leading to wide particle size distributions, while also enabling enhanced battery performance, even in the total absence of surfactant. It is believed that this effect may also be extended to other alcohols capable of forming such micelle-like structures on the surface of the slurry solids, in particular terminal alcohols having at least 3 carbons. However, as should be appreciated, a careful balance must also be struck between the chain length of the alcohol and the miscibility of the alcohol with the water used to produce the slurry. Furthermore, the use of smaller chain alcohols may also provide the benefit of a lower amount of energy required for drying compared to water alone. Indeed, alcohols such as 1-propanol and the like may also act to azeotrope certain amounts of water during drying of the coated electrode, which may further reduce the amount of water present within the coated electrode. Accordingly, while both surfactants and alcohols may mitigate particle agglomeration, the use of short chain alcohols (e.g., 4 carbons or less) may result in less residuals associated with the coated electrode.

The present disclosure encompasses any relative ratio of alcohols to water. Indeed, the use of any amount of one or more alcohols is presently contemplated. However, reducing the amount of alcohols used may be desirable in order to reduce the cost associated with electrode production. Thus, in accordance with certain embodiments, the liquid of the slurry may include one or more alcohols, but the total amount of alcohols may not exceed a certain weight percentage of the total weight of the slurry. For example, the alcohols may be present in an amount not exceeding 5% by weight, not exceeding approximately 10% by weight, not exceeding approximately 15% by weight, or not exceeding approximately 20% by weight, based on the weight of the slurry. By way of example, the alcohols may be present in an amount between approximately 0.1% by weight and approximately 10% by weight, between approximately 1% by weight and approximately 9% by weight, between approximately 3% by weight and approximately 7% by weight, or between approximately 4% by weight and approximately 6% by weight, based on the weight of the slurry. By way of further non-limiting example, the alcohols may be present in an amount of approximately 0.1% by weight, approximately 0.5% by weight, approximately 1% by weight, approximately 1.5% by weight, approximately 2.0% by weight, approximately 2.5% by weight, approximately 3.0% by weight, approximately 3.5% by weight, approximately 4.0% by weight, approximately 4.5% by weight, approximately 5.0% by weight, approximately 5.5% by weight, or approximately 6.0% by weight, based on the weight of the slurry.

The total amount of liquid, be it all water or a mixture consisting essentially of water and one or more alcohols, will generally account for a substantial amount of the total weight of the slurry, depending on the particular viscosity desired for the slurry, among other parameters. For example, the total amount of liquid present in the slurry may be present in an amount between approximately 10% by weight and approximately 60% by weight, based on the total weight of the slurry, such as between approximately 20% by weight and approximately 50% by weight, between approximately 25% and approximately 45% by weight, or between approximately 30% by weight and approximately 40% by weight, based on the total weight of the slurry.

Example Cathode Slurry Compositions

As noted above, the cathode slurry composition may include various additives commonly used and known to those of ordinary skill in the art. However, because the present approaches involve the subtle interplay of the materials noted above, namely the electrode active material, the conductivity enhancer, the polymeric binder, the viscosity enhancer, the surfactant, and the liquid, it may be desirable for the slurry to consist essentially of, or consist of, these materials. Indeed, in some embodiments, the slurry may consist essentially of, or consist of, the electrode active material, the conductivity enhancer, the polymeric binder, the viscosity enhancer, and the liquid, which, in such embodiments where a surfactant is not utilized, includes a water/alcohol mixture (which may include one or more alcohols). In other embodiments, the slurry may consist essentially of, or consist of, the electrode active material, the conductivity enhancer, the polymeric binder, the viscosity enhancer, the surfactant and the liquid, which, in such embodiments where a surfactant is utilized, consists essentially of water (i.e., no alcohol or other solvents are used).

Accordingly, in some embodiments where no surfactant is used in the cathode slurry composition, the slurry may be formed from an electrode formulation and a liquid such that the slurry includes particles dispersed within the liquid, wherein the electrode formulation consists essentially of, or consists of, an electrode active material, a conductive carbon source (e.g., the conductivity enhancer), an organic polymeric binder, and a water-soluble polymer (e.g., the viscosity enhancer), and the liquid consists essentially of, or consists of, a mixture of water and one or more alcohols (e.g., 1-propanol or any other alcohol or mixture of alcohols, such as those noted above). On the other hand, in some embodiments where the surfactant is used in the cathode slurry composition, the slurry may be formed from an electrode formulation, a liquid, and a surfactant such that the slurry includes particles dispersed within the liquid, the electrode formulation consists essentially of, or consists of, an electrode active material, a conductive carbon source (e.g., the conductivity enhancer), an organic polymeric binder, and a water-soluble polymer (e.g., the viscosity enhancer), the additive is a surfactant (e.g., an arene-capped polyoxoethylene surfactant) and the liquid consists essentially of, or consists of, water.

Presented below are example combinations of ranges for the cathode slurry compositions. Generally, the electrode active material, conductivity enhancer, polymeric binder, and viscosity enhancer will be represented in terms of their relative contribution to the weight of solids in the slurry, as the solids are generally incorporated into the coated electrode formed using the slurry. On the other hand, the surfactant and alcohol are represented below in terms of their relative contributions to the weight of the slurry. However, it should be noted that the surfactant may, to some extent, be incorporated into the coated electrode (albeit in much smaller amounts than the solid materials).

TABLE 1

| Electrode Formulation | Range 1 | Range 2 | Range 3 | Range 4 |
|---|---|---|---|---|
| Example Slurry Compositions | | | | |
| % by weight of electrode formulation | | | | |
| Electrode Active Material | 90-99 | 92-96 | 93-95 | 93.5-94.5 |
| Conductivity Enhancer | 0-10 | 0.5-8 | 2-6 | 3-5 |
| Polymeric Binder | 0-5 | 0.1-4.0 | 0.5-3.0 | 1.0-1.5 |
| Viscosity Enhancer | 0.1-5.0 | 0.3-3.0 | 0.4-2.0 | 0.5-1.0 |
| Additional Slurry Components | | | | |
| % by weight of slurry | | | | |
| Surfactant | 0.05-1.0 | 0.05-0.5 | 0.05-0.2 | 0.05-0.1 |
| Alcohol | 0.1-10 | 1-9 | 3-7 | 4-6 |
| Total Liquid | 10-60 | 25-55 | 20-50 | 30-40 |

Again, the alcohol and surfactant may be used together, although when the surfactant is used, the alcohol may not be necessary and when the alcohol is used, the surfactant may not be necessary. Thus, for the surfactant and alcohol, Table 1 is intended to represent situations where no alcohol is used for all of Ranges 1-4 of the surfactant (i.e., the weight percentage of the alcohol is 0), as well as situations where alcohol is used in the listed amounts in combination with the use of surfactant in the listed amounts for Ranges 1-4. Similarly, Table 1 is also intended to encompass situations where no surfactant is used for all of Ranges 1-4 of the alcohol (i.e., the weight percentage of the surfactant is 0, but the alcohol is present in the listed amounts).

In the ranges presented in Table 1 above, it should be further noted that the only other slurry component not listed is water, which accounts for all of the total liquid set forth in Table 1 (e.g., when no alcohol is used), or the remainder of the total liquid set forth in Table 1 when alcohol is utilized (i.e., the difference between the total liquid in Table 1 and the listed amount of Alcohol).

While the present disclosure encompasses the use of the ranges listed in Table 1, it should be noted that the likelihood of enhanced performance will generally increase as the ranges move from Range 1 to Range 4 (i.e., into more limited ranges). Indeed, the present inventors have found that for the amounts listed in Range 4, the resulting coated electrode and lithium ion battery will generally display better performance than their counterparts produced using other slurry techniques, such as those employing mixtures of water and NMP. In this regard, it should be noted that even minor changes in electrode formulations can have a marked effect on the performance of the coated electrode.

Particle Size

The present disclosure enables, with the use of either an alcohol or a surfactant during slurry formation (or after slurry formation), the production of a slurry having a particle size distribution that enables desired levels of performance in their resulting coated electrodes. To this end, enabling the formation/stabilization of smaller particle sizes will generally lead to enhanced electrode performance. In accordance with present embodiments, it may generally be desirable to prevent particle agglomeration during slurry formation by an extent such that the average particle size of the slurry solids (i.e., the solid particles of the slurry) is substantially the same as the average particle size of the powder of the electrode active material (e.g., NMC) before its use in the slurry.

Utilizing the approaches above, it may be possible to obtain average particle sizes for the slurry solids that are quite similar to the average particle size of the electrode active material. One common way to denote particle size, and, more specifically, particle size distribution, is the use of $D_x=y$, where y is a diameter value (e.g., in microns, μm), and x represents the percentage of particles having a diameter that is equal to or less than x. For example, a particle size distribution $D_{20}$ of 15 microns means that 20% of the particles in a sample have a diameter of equal to or less than 15 microns. Similarly, a particle size distribution $D_{50}$ of 15 microns means that 50% of the particles in a sample have a diameter of equal to or less than 15 microns. These values can be measured, for example, according to ASTM-D1921. Accordingly, comparing these values between two samples, such as between the slurry solids and the powder of the electrode active material, can provide a useful measurement for determining the extent of particle agglomeration mitigation, at least to the extent that the particles will agglomerate to form particles that are larger than those present in the electrode active material powder. For example, if a particle size distribution $D_{50}$ of the slurry solids is much higher than the particle size distribution $D_{50}$ of the powder, this indicates that the extent of particle agglomeration may be undesirably high. As the "x" value increases and remains substantially the same as the "y" value between the samples, this indicates that the extent of particle agglomeration may be significantly reduced (provided that larger particle sizes denote large amounts of agglomeration). Generally, the approaches described herein may generate slurries where the particle size distribution $D_{50}$ of the slurry solids is between approximately 20 microns and approximately 6 microns, such as between approximately 18 microns and approximately 6 microns, between approximately 16 microns and approximately 6 microns, between approximately 14 microns and approximately 6 microns, between approximately 12 microns and approximately 6 microns, or between approximately 10 microns and approximately 6 microns (e.g., between approximately 10 microns and approximately 6.5 microns). By way of further example, the particle size distribution $D_{50}$ may be approximately 15 microns or less, approximately 14 microns or less, approximately 13 microns or less, approximately 12 microns or less, approximately 11 microns or less, or approximately 10 microns or less.

In some embodiments, the particle size distributions $D_{50}$, $D_{75}$, and $D_{90}$ of the slurry solids (the slurry components noted above) may be no more than 20% larger than the respective particle size distributions $D_{50}$, $D_{75}$, and $D_{90}$ of the electrode active material powder, such as no more than 15%, no more than 10%, no more than 5%, or no more than 1%.

In other words, the ratio of particle size distributions $D_{50}$, $D_{75}$, and $D_{90}$ of the slurry solids (the slurry components noted above) to the respective particle size distributions $D_{50}$, $D_{75}$, and $D_{90}$ of the electrode active material powder may be between 1:1 and 1:1.2, such as between 1:1 and 1:1.15, between 1:1 and 1:1.05, or between 1:1 and 1:1.01, for example based on the data discussed below.

With respect to the use of surfactants, in some embodiments, arene-capped polyoxoethylene surfactants, such as TRITON™ X-100 polyoxoethylene p-(1,1,3,3-tetramethylbutyl)phenyl ether surfactant, may generally have $D_{50}$ and $D_{75}$ values that are substantially the same as the powdered electrode active material. For alcohols, and specifically 1-propanol, the $D_{50}$ and $D_{75}$ values are generally no more than 10-20% larger than the same respective values for the powdered electrode active material. However, the $D_{90}$ values for both surfactants and terminal, non-branched alcohols (e.g., 1-propanol) are substantially the same.

$D_{25}$ values, which provide a measure of the overall distribution of particle size when combined with the above values, indicate that arene-capped polyoxoethylene surfactants, such as TRITON™ X-100 polyoxoethylene p-(1,1,3,3-tetramethylbutyl) phenyl ether surfactant available from The Dow Chemical Company of Midland, Mich., will generally have $D_{25}$ values that are no more than about 20% larger than the $D_{25}$ value of the powdered electrode active material. Accordingly, such types of surfactants may generally be considered to have good particle agglomeration mitigation ability such that the a measure of cumulative finer volume percent closely follows the cumulative finer volume percent of the powder. The $D_{25}$ values for alcohols may be significantly higher, such as 40% higher, or more (depending on the particular alcohol). This may indicate that alcohols, such as linear, non-branched terminal alcohols (e.g., 1-propanol) favor a tighter particle size distribution, and allows some degree of particle agglomeration to occur with smaller-sized particles (e.g., less than the $D_{50}$ value of the powder).

By way of specific example with respect to a lithium-nickel-manganese-cobalt (NMC) electrode active material powder having a $D_{50}$ of about 6.5 microns, a $D_{75}$ of about 10 microns, and a $D_{90}$ of about 15.5 microns, the present approaches for slurry formation may enable a $D_{50}$ of less than 10 microns, such as between 6.5 microns and 10 microns, a $D_{75}$ of less than 15 microns, such as between 10 microns and 15 microns, and a $D_{90}$ of less than 20 microns, such as between 15 microns and 20 microns. Again, the particular value will depend on the particular surfactant or alcohol chosen for the slurry preparation, with arene-capped polyoxoethylene surfactants and linear alcohols providing particle size distributions closest to the electrode active material powder.

Figure 3:
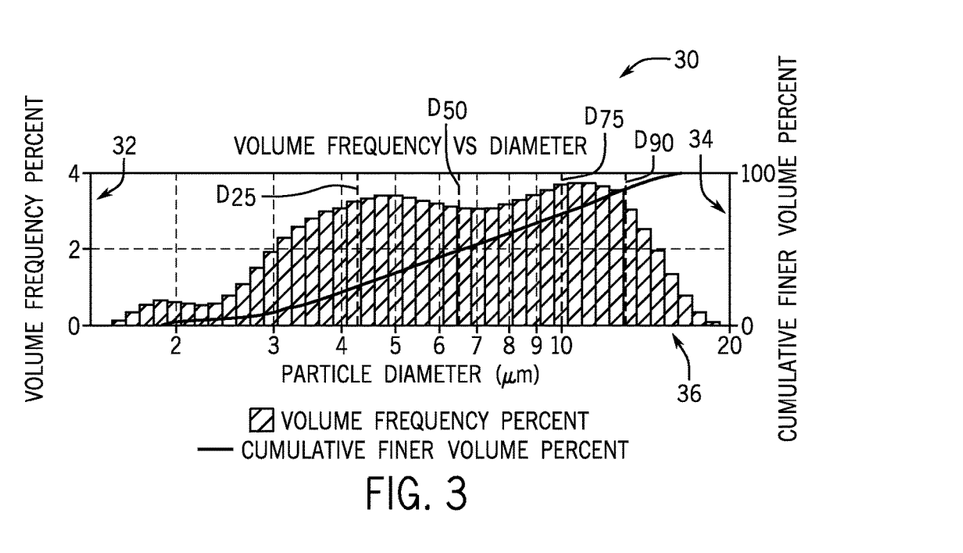
FIG. 3 is a plot of volume frequency percent and cumulative finer volume percent as a function of particle diameter for a lithium-nickel-manganese-cobalt oxide (NMC, $LiNi_{1/3}Mn_{1/3}Co_{1/3}O_2$) electrode active material powder, in accordance with an embodiment of the present approach.

The present techniques may be further appreciated with reference to FIGS. 3-6, which illustrate plots of particle diameter, volume frequency percent, and cumulative finer volume percent obtained using the lithium-nickel-manganese-cobalt (NMC) electrode active material powder having a $D_{50}$ of about 6.5 microns, a $D_{75}$ of about 10 microns, and a $D_{90}$ of about 15.5 microns noted above for various slurry preparation methods. Specifically, FIG. 3 is a plot 30 obtained for the lithium-nickel-manganese-cobalt (NMC) electrode active material powder of volume frequency percent 32 and cumulative finer volume percent 34 as a function of particle diameter 36. As depicted, the powder displays a relatively even distribution across the range of about 3 microns to about 15 microns, with the $D_{50}$, $D_{75}$, and $D_{90}$ values being as noted above (as measured based on the cumulative finer volume percent 34).

Figure 4:
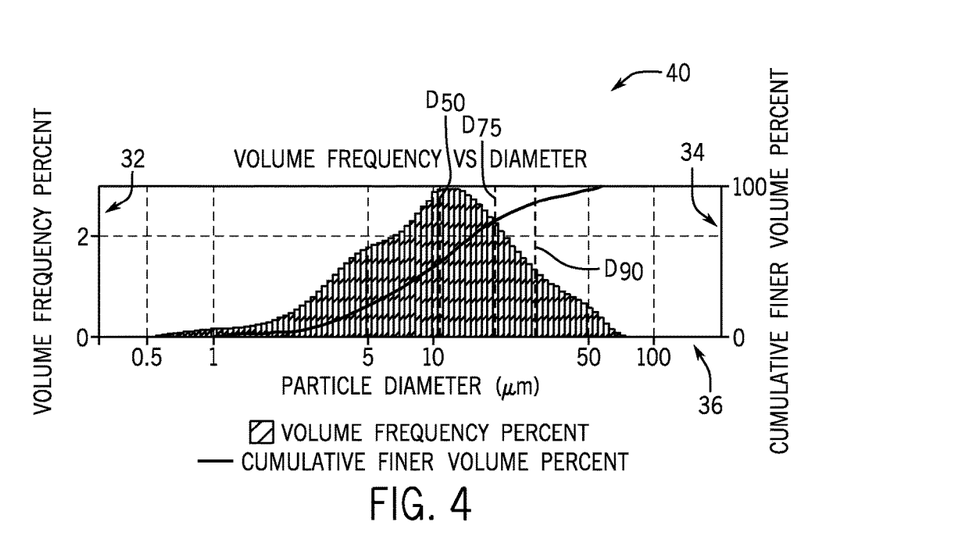
FIG. 4 is a plot of volume frequency percent and cumulative finer volume percent as a function of particle diameter for a slurry produced using an electrode formulation and water, the electrode formulation incorporating the NMC electrode active material referenced with respect to FIG. 3, in accordance with an embodiment of the present approach.

FIG. 4 depicts a plot 40 obtained for a comparative example in which the slurry was prepared using only water as the liquid. Specifically, the plot 40 depicts particle size data obtained for a slurry prepared using a mixture of 94% by weight NMC positive electrode active material (the material discussed above with respect to FIG. 3), 4% by weight carbon black as the conductivity enhancer, 1.5% by weight SBR as the organic polymeric binder, and 0.5% by weight CMC as the viscosity enhancer. All of these weight percentages are based on the cumulative weight of these materials in the slurry, and not based on the total weight of the slurry (i.e., in the same manner set forth in Table 1). The slurry was prepared without any alcohol and without any surfactant. As shown, the particle size distribution (as measured based on the cumulative finer volume percent) $D_{50}$ value is approximately 11.5 microns. However, the $D_{75}$ value is nearly 20 microns (almost double the $D_{75}$ value of the powder) and the $D_{90}$ value is nearly 45 microns, which is almost three times the $D_{90}$ value of the powder. As should be appreciated from the data, water causes significant particle agglomeration, causing large $D_{75}$ and $D_{90}$ values—this would be expected to reduce electrode performance.

Figure 5:
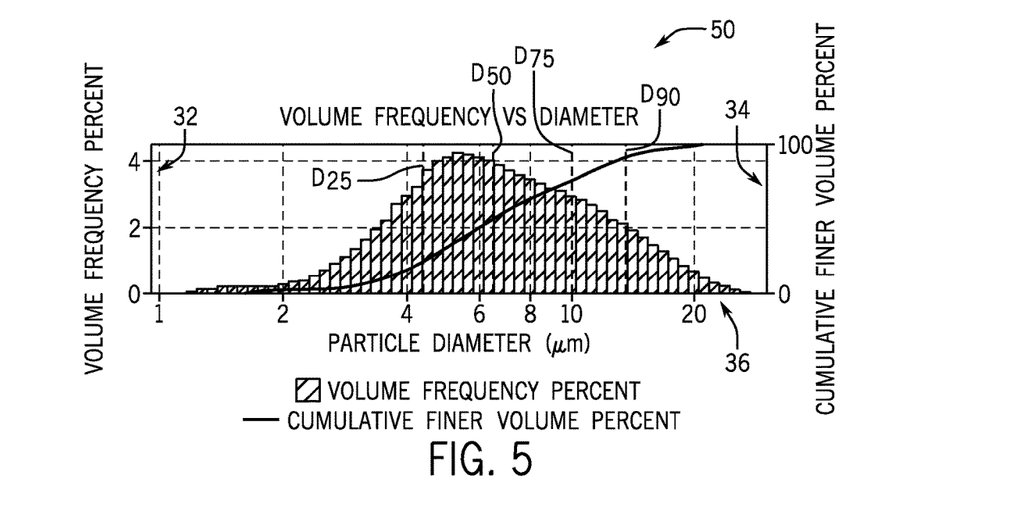
FIG. 5 is a plot of volume frequency percent and cumulative finer volume percent as a function of particle diameter for a slurry produced using the electrode formulation referenced with respect to FIG. 4, water, and polyoxoethylene p-(1,1,3,3-tetramethylbutyl) phenyl ether surfactant, in accordance with an embodiment of the present approach.

FIG. 5 depicts a plot 50 obtained for a first example of a slurry prepared using only water as the liquid and also using a surfactant. Specifically, the plot 50 depicts data obtained for slurry solids prepared using the slurry materials discussed above with respect to FIG. 4, without any alcohol but using 0.1% by weight of TRITON™ X-100 polyoxoethylene p-(1,1,3,3-tetramethylbutyl) phenyl ether surfactant. As shown, the particle size distribution (as measured based on the cumulative finer volume percent) $D_{50}$ value is approximately 6.5 microns, which is substantially the same as the powder. The $D_{75}$ and $D_{90}$ values are also substantially the same (10 microns and 15.5 microns, respectively). Accordingly, the arene-capped polyoxoethylene surfactant may be considered to significantly mitigate or altogether prevent particle agglomeration, which would be expected to maintain or enhance electrode performance.

Figure 6:
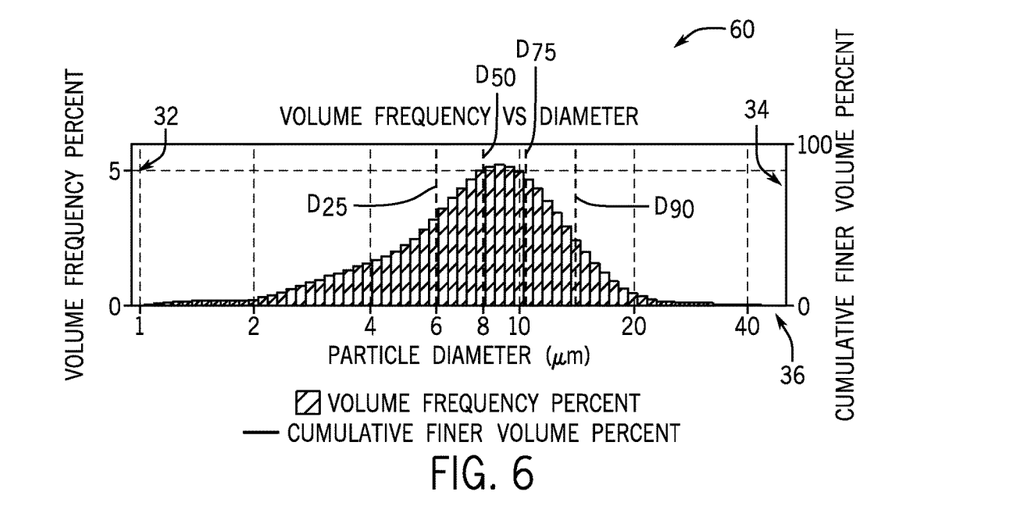
FIG. 6 is a plot of volume frequency percent and cumulative finer volume percent as a function of particle diameter for a slurry produced using the electrode formulation referenced with respect to FIG. 4, water, and 1-propanol, in accordance with an embodiment of the present approach.

FIG. 6 depicts a plot 60 obtained for a second example in which a slurry was prepared using 5% by weight 1-propanol, based on the total weight of the slurry, in combination with water as the slurry liquid. Specifically, the plot 60 depicts data obtained for slurry solids prepared using the slurry materials discussed above with respect to FIG. 4, without any surfactant. As shown, the particle size distribution (as measured based on the cumulative finer volume percent) $D_{50}$ value is approximately 8 microns, which provides a $D_{50}$ powder to $D_{50}$ slurry particle ratio of about 1:1.2. The $D_{75}$ value of the slurry is approximately 11 microns, which provides a $D_{75}$ powder to $D_{75}$ slurry particle ratio of about 1:1.1. The $D_{90}$ values are substantially the same (about 15.5 microns). Accordingly, the 1-propanol may be considered to significantly mitigate particle agglomeration for particle sizes at or above the $D_{50}$ of the powder, but enable a small degree of particle agglomeration for smaller-sized particles. While this would be expected to maintain or enhance electrode performance to a certain degree, the use of 1-propanol in the slurry preparation provides surprisingly good battery performance, as discussed in further detail below.

Performance of the Coated Electrodes in Lithium Ion Batteries

As noted above, the electrodes produced according to the present technique may be coated electrodes in which the electrode active material is coated onto the surface of a collector, which is often a conductive metal that serves as an interface for a battery terminal. Indeed the present disclosure encompasses positive and negative electrodes produced according to the embodiments described above, where any one of the components described above may be used with any other of the components described above in any combination. Thus, secondary lithium ion batteries may be produced by incorporating, among other things, positive electrodes produced in accordance with the techniques described herein, an electrolyte (which will generally include a lithium ion source and a solvent for dissociating the source), and an anode, which may be produced according to an all-water slurry method as noted above. In accordance with an embodiment, the battery may be an automotive battery integrated into the framework of an xEV.

Any source of lithium ions may be used in the electrolyte, and will be readily apparent to those of ordinary skill in the art. Indeed, the electrolyte will also generally include one, two, three, or more solvents and optional additives to facilitate ion transfer and electrode stability. By way of example, such solvents may include alkyl esters, cyclic alkyl carbonates, non-cyclic alkyl carbonates, vinyl carbonates, and mixtures thereof. Additives may include borates, carbonates, and the like.

Again, batteries incorporating the present positive coated electrodes may display excellent performance. One common measure of battery performance is the capacity, or the capacity retention, of a battery constructed using a particular positive electrode, as a function of charge rate, commonly referred to as "C-rate." A variety of C-rates may be used to test performance, including a 1C rate, a 2C rate, a 5C rate, and a 10C rate, where the increasing number signifies a faster charge (or discharge) rate. For example, the 1C rate is a discharge rate at which the battery will be able to provide a current for one hour equal to its rated capacity, and 10C is a discharge rate at which the battery will be able to provide a current at 10 times its rated capacity for 6 minutes (i.e., one-tenth of an hour). For example, a 1,000 mAh-rated cell, at a 10C rate, will discharge at 10,000 mA for 6 minutes. Accordingly, positive electrodes are considered to have enhanced performance when they retain relatively high amounts of capacity at a 10C rate (a high discharge rate).

Figure 7:
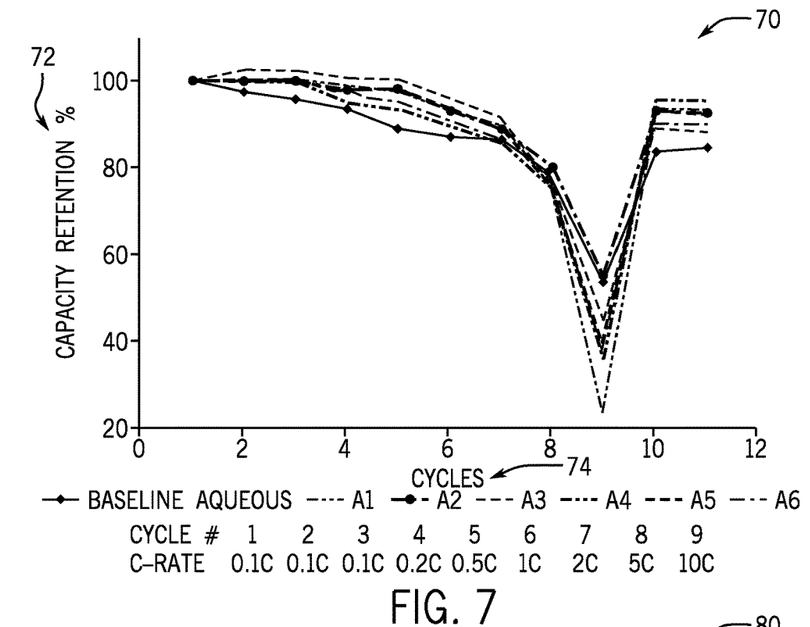
FIG. 7 is a plot of capacity retention percentage as a function of discharge cycles performed at varying charge/discharge rates (C-rates), for positive electrodes produced using a plurality of electrode formulations, in accordance with an embodiment of the present approach.

As noted above, the electrode formulation ranges set forth in Table 1 may be useful for generating a wide variety of coated positive electrodes. However, as also noted above, it should be appreciated that changes in the formulation can drastically affect the performance of the positive electrode. Table 2 below provides a series of example electrode formulations, and FIG. 7 is a combined plot 70 providing performance data (capacity retention percentage 72) as a function of cycle number 74, where each cycle is performed at a different C-rate, in this case a different discharge rate.

TABLE 2

Example Electrode Formulations

| Formulation | % by weight of electrode formulation | | | |
| --- | --- | --- | --- | --- |
| | NMC | CB | CMC | SBR |
| Baseline | 94.0% | 4.0% | 0.5% | 1.5% |
| A1 | 93.5% | 4.0% | 1.0% | 1.5% |
| A2 | 93.7% | 4.0% | 1.0% | 1.3% |
| A3 | 94.0% | 4.0% | 1.0% | 1.0% |
| A4 | 93.8% | 4.0% | 0.7% | 1.5% |
| A5 | 94.0% | 4.0% | 0.7% | 1.3% |
| A6 | 94.3% | 4.0% | 0.7% | 1.0% |

As depicted in the plot 70 of FIG. 7, the C-rates are: C/10 (0.1C) at cycles 1-3, C/5 (0.2C) at cycle 4, C/2 at cycle 5 (0.5C), 1C at cycle 6, 2C at cycle 7, 5C at cycle 8, 10C at cycle 9, and a 1C rate at cycle 10 and afterwards. Accordingly, the data is expected to show a drop in capacity retention percentage 72 as the cycle number progresses, since the rate of discharge is increasing.

As shown in the plot 70, between the 0.1 rate and 1C rate, the formulation listed as the baseline has the lowest capacity retention percentage, while formulation A5 clearly has the highest capacity retention percentage. However, at higher C rates, such as starting at the 5C rate, this trend reverses and the baseline formulation has the highest capacity retention percentage and the formulation A5 has the lowest capacity retention. Accordingly, the electrode formulations presented herein may be specifically designed for a particular implementation where the formulation may be matched to the discharge rate that the battery is most likely to experience.

As noted above, secondary lithium ion batteries incorporating the coated electrodes produced in accordance with the present technique may provide enhanced performance compared to electrodes produced using all-aqueous slurry preparation methods without a surfactant or an alcohol. For example, batteries incorporating positive coated electrodes produced according to the present technique may retain between 50% and 70% of their discharge capacity at a 10C rate, between 70% and 85% of their discharge capacity at a 5C rate, between 80% and 90% of their discharge capacity at a 2C rate, and above 90% of their discharge capacity at a 1C rate.

Figure 8:
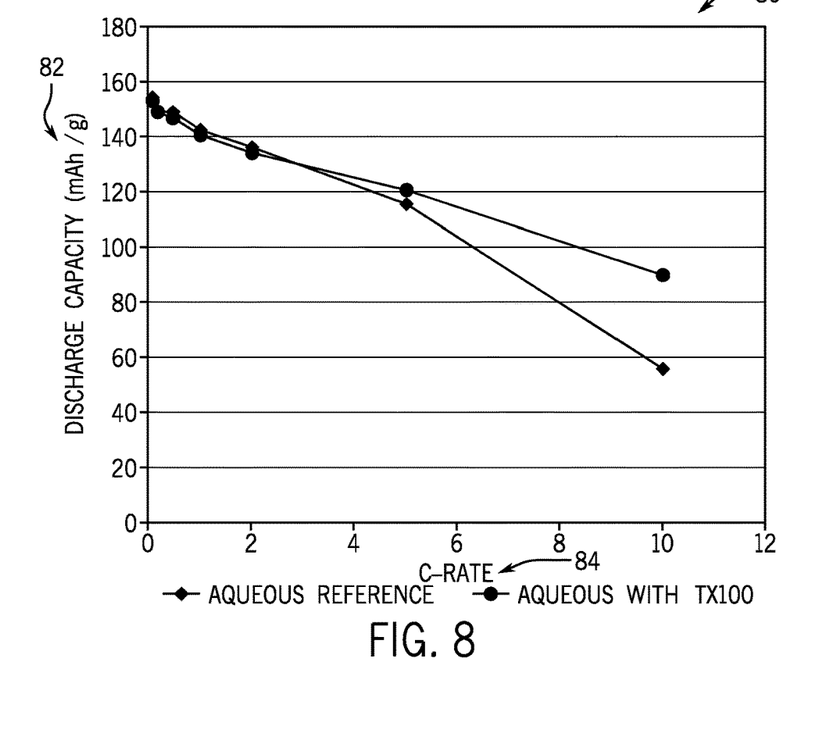
FIG. 8 is a plot of discharge capacity as a function of C-rate for a positive electrode produced using the electrode formulation referenced with respect to FIG. 4, water, and the polyoxoethylene p-(1,1,3,3-tetramethylbutyl) phenyl ether surfactant mixture referenced with respect to FIG. 5, in accordance with an embodiment of the present approach.

Referring now to FIG. 8, a plot 80 is illustrated depicting the performance of a secondary lithium ion battery that incorporates a positive electrode produced using only water as the slurry liquid in combination with TRITON™ X-100 polyoxoethylene p-(1,1,3,3-tetramethylbutyl) phenyl ether surfactant (an arene-capped polyoxoethylene surfactant). The electrode formulation is the same as set forth above with respect to FIGS. 4-6. The plot 80 specifically includes discharge capacity in milliamp hours per gram (mAh/g) 82 (which may also be considered to represent the power density of the battery) as a function of C-rate 84 for a positive electrode formed using the surfactant and a positive electrode formed using no surfactant. As clearly shown, at higher C-rates, the positive electrode produced using the surfactant retains about 20% more of its discharge capacity at a 10C rate compared to the reference. It is believed that this is a result of smaller particle size in the slurry, as well as a more even coating (e.g., a lower surface roughness) on the surface of the collector.

Figure 9:
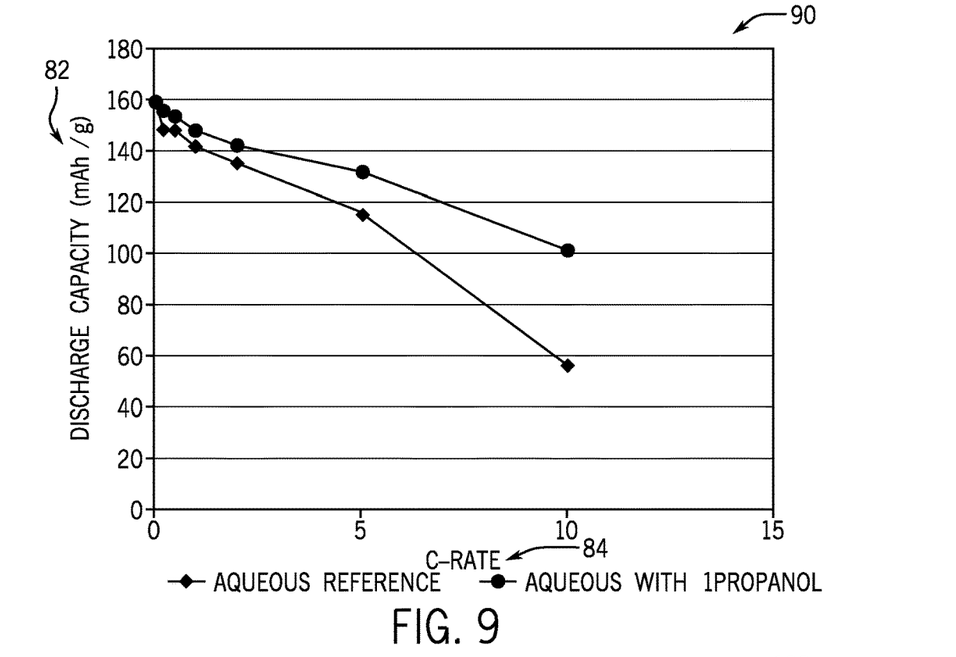
FIG. 9 is a plot of discharge capacity as a function of C-rate for a positive electrode produced using the electrode formulation referenced with respect to FIG. 4, and the water/1-propanol mixture referenced with respect to FIG. 6, in accordance with an embodiment of the present approach.

FIG. 9 shows a similar plot 90 depicting the performance of a secondary lithium ion battery that incorporates a positive electrode produced using a water/1-propanol mixture as the slurry liquid. The electrode formulation is the same as set forth above with respect to FIGS. 4-6. The plot 90 includes discharge capacity in mAh/g 82 as a function of C-rate 84 for a positive electrode formed using 1-propanol in the slurry liquid in an amount of 5% by weight, based on the weight of the slurry, and a positive electrode formed using no surfactant and no alcohol. As above with the surfactant-based electrode, at higher C-rates, the positive electrode produced using the alcohol is clearly superior, and retains more of its discharge capacity at a 10C rate compared to the reference, in this case about 25% more. As with the surfactant-based electrode, this enhanced performance is believed to be a result of smaller particle size in the slurry, as well as a more even coating (e.g., a lower surface roughness) on the surface of the collector. In addition, it should be noted that an additional enhancement of performance may be provided by the 1-propanol in that less residual water, and no residual surfactant, may be present in the coated positive electrode compared to the electrode produced using a surfactant.

Figure 10:
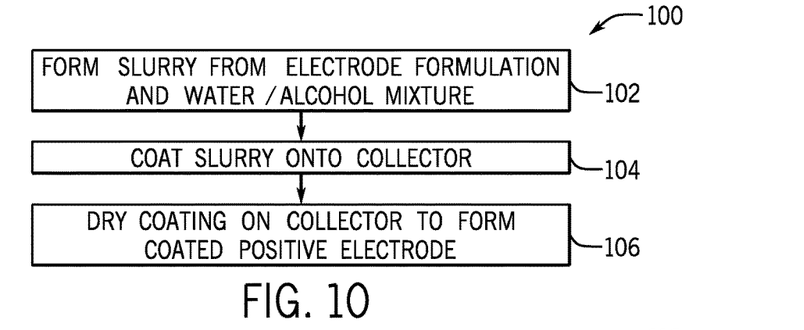
FIG. 10 is a process flow diagram of an embodiment of producing a coated positive electrode using a slurry produced using a water/alcohol mixture, in accordance with an embodiment of the present approach.
Figure 11:
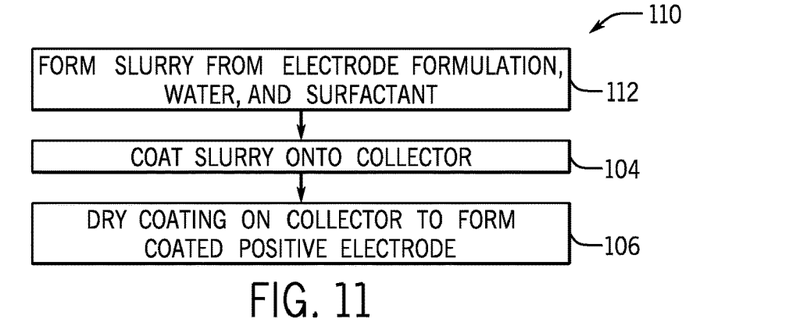
FIG. 11 is a process flow diagram of an embodiment of producing a coated positive electrode using a slurry produced using a surfactant in water, in accordance with an embodiment of the present approach.

FIGS. 10 and 11 are process flow diagrams depicting embodiments of methods for producing a coated positive electrode in accordance with the present disclosure. Specifically, FIG. 10 is a method 100 for producing a coated positive electrode using a water/alcohol slurry. The method 100 includes producing (block 102) a slurry from an electrode formulation and a water/alcohol mixture. The electrode formulation may include the positive electrode active material, and may be used in combination with any one or a combination of the other electrode formulation components described above. Thus, the electrode formulation, in some embodiments, may be the positive electrode active material, and one or more other components selected from the group consisting of: a conductivity enhancer, a polymeric binder, and a viscosity enhancer. The water/alcohol mixture may, in some embodiments, include only water and one or more alcohols. In some embodiments, the resulting slurry may have particles having a particle size distribution $D_{50}$ of less than 10 microns, such as less than 8 microns.

In some embodiments, the water/alcohol is a mixture of water and only one alcohol, such as 1-propanol. The alcohol may be present in the slurry in an amount of 10% by weight or less, such as between approximately 0.1% by weight and approximately 10% by weight, based on the weight of the slurry, or between approximately 3% by weight and approximately 7% by weight (e.g., approximately 5% by weight), based on the weight of the slurry.

The method 100 may further include coating (block 104) a collector, such as an aluminum, nickel, or stainless steel foil or rod. The coating may be performed by any suitable coating process in which a slurry can be used. For example, the coating may be performed by knife coating, notched bar coating, dip coating, spray coating, electrospray coating, or gravure coating.

The method 100 may further include drying (block 106) the coating onto the collector, which forms the coated positive electrode. The drying may be performed in any suitable manner to produce the coated electrode, for example by drying in an oven at an elevated temperature (e.g., above about 70° C.) for a certain period of time (e.g., between about 20 minutes and an hour).

FIG. 11 depicts a method 110 for producing a coated positive electrode using water and a surfactant. The method 110 includes producing (block 112) a slurry from an electrode formulation, water as the only source of liquid, and a surfactant. The electrode formulation may include the positive electrode active material, and may be used in combination with any one or a combination of the other electrode formulation components described above. Thus, the electrode formulation, in some embodiments, may be the positive electrode active material, and one or more other components selected from the group consisting of: a conductivity enhancer, a polymeric binder, and a viscosity enhancer. In some embodiments, the resulting slurry may have particles having a particle size distribution $D_{50}$ of less than 10 microns, such as less than 8 microns, for example between 6.5 microns and 8 microns.

The surfactant may be any of the surfactants noted above, and in some embodiments is an arene-capped polyoxoethylene surfactant. In one embodiment, the surfactant is polyoxoethylene p-(1,1,3,3-tetramethylbutyl)phenyl ether. The surfactant may be present in an amount of less than approximately 1% by weight based on the weight of the slurry, such as between approximately 0.01% by weight and approximately 0.5% by weight, based on the weight of the slurry. The acts of coating (block 104) and drying (block 106) may be performed as described above to produce the coated positive electrode.

One or more of the disclosed embodiments, alone or on combination, may provide one or more technical effects useful in the production of positive electrodes for ion batteries (e.g., secondary lithium ion batteries). For example, certain embodiments of the present approach may enable extended lifetimes of such batteries, including positive electrodes, negative electrodes, and electrolytes, among others. Indeed, the approaches described herein may improve the production of battery modules 22 by enabling the electrodes of the battery modules 22 to be produced in a more environmentally-friendly manner and also by eliminating costly manufacturing steps, such as solvent recycling. The approaches described herein may also provide battery modules with higher power densities and improved capacity retention, even at high discharge rates. By specific example, replacing a used component of the battery module 22 with a new respective component may enable the resulting remanufactured battery module 22 to approach its original performance standards. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation. Further, although individual embodiments are discussed herein, the disclosure is intended to cover all combinations of these embodiments.

The invention claimed is:

1. A method of making a positive electrode, comprising:
forming a slurry from an electrode formulation, an additive comprising an arene-capped polyoxoethylene surfactant, and a liquid such that the slurry comprises particles of the electrode formulation dispersed within the liquid, wherein the particles of the electrode formulation have a particle size distribution $D_{50}$ of 15 microns or less in the slurry;
coating the slurry on a collector; and
drying the coating on the collector to form the positive electrode,
wherein the electrode formulation comprises a lithium-nickel-manganese-cobalt composite oxide as at least one electrode active material, a conductive carbon source, an organic polymeric binder, and a water-soluble polymer, and wherein the liquid consists essentially of water.

2. The method of claim 1, wherein the arene-capped polyoxoethylene is present in an amount of between 0.05% by weight and 0.5% by weight, based on the weight of the slurry.

3. The method of claim 1, wherein the arene-capped polyoxoethylene has the general formula Ar—$O(C_2H_4O)_n$, wherein Ar is an aromatic group or a substituted aromatic group and n is an integer greater than 4.

4. The method of claim 1, wherein the arene-capped polyoxoethylene has the general formula:

wherein $R^1$ is an alkyl group having between 1 and 14 carbons and n is an integer greater than 4.

5. The method of claim 1, wherein the arene-capped polyoxoethylene has the general formula:

wherein n is an integer greater than 4.

6. The method of claim 1, wherein the particles have a particle size distribution $D_{75}$ of 10 microns or less.

7. The method of claim 1, wherein the electrode formulation consists essentially of the electrode active material, the conductive carbon source, the organic polymeric binder, and the water-soluble polymer, wherein:
the conductive carbon source is present in an amount of less than 4% by weight, based on the total weight of the electrode formulation;
the organic copolymer binder is present in an amount between 1.0% by weight and 1.5% by weight, based on the total weight of the electrode formulation;
the water-soluble polymer is present in an amount between 0.5% by weight and 1.0% by weight, based on the total weight of the electrode formulation; and
the at least one electrode active material is present in an amount between 93.5% by weight and 94.5% by weight, based on the total weight of the electrode formulation.

8. The method of claim 7, wherein the conductive carbon source is carbon black, the organic polymer binder is a monovinylarene-conjugated diene copolymer, and the water soluble polymer is a cellulose derivative.

9. The method of claim 1, wherein the particles of the electrode formulation have a particle size distribution $D_{50}$ of between 14 microns and 6 microns.

10. The method of claim 1, wherein the particles of the electrode formulation have a particle size distribution $D_{50}$ of between 12 microns and 6 microns.

11. The method of claim 1, wherein the particles of the electrode formulation have a particle size distribution $D_{50}$ of between 10 microns and 6 microns.

12. A positive electrode formed by a process, the process comprising:
forming a slurry from an electrode formulation and a liquid such that the slurry comprises particles of the electrode formulation dispersed within the liquid, wherein the particles of the electrode formulation have a particle size distribution $D_{50}$ of 15 microns or less when the particles of the electrode formulation are dispersed in the slurry;
coating the slurry on a collector; and
drying the coated collector to form the positive electrode, wherein the electrode formulation comprises at least one electrode active material, a conductive carbon source, an organic polymeric binder, and a water-soluble polymer, and wherein the liquid consists essentially of water or a mixture of water and an alcohol, wherein when the liquid consists essentially of the mixture, the alcohol is present in an amount of less than 10% by weight, based on the weight of the slurry, and wherein when the liquid consists essentially of water, the slurry is formed from the electrode formulation, the liquid, and an arene-capped polyoxoethylene surfactant.

13. The positive electrode of claim 12, wherein the liquid consists essentially of the mixture, and the alcohol consists essentially of 1-propanol in an amount between 3% by weight and 7% by weight, based on the weight of the slurry.

14. The positive electrode of claim 12, wherein the liquid consists essentially of water, and the arene-capped polyoxoethylene surfactant has the general formula:

wherein n is an integer greater than 4, and the arene-capped polyoxoethylene surfactant is present in an amount of between 0.05% by weight and 0.5% by weight, based on the weight of the slurry.

15. The positive electrode of claim 12, wherein the electrode formulation consists essentially of the at least one electrode active material, the conductive carbon source, the organic polymeric binder, and the water-soluble polymer, wherein:

the conductive carbon source is carbon black present in an amount of less than 4% by weight, based on the total weight of the electrode formulation;

the organic polymeric binder is a monovinylarene-conjugated diene copolymer rubber present in an amount between 1.0% by weight and 1.5% by weight, based on the total weight of the electrode formulation;

the water-soluble polymer is a cellulose derivative present in an amount between 0.5% by weight and 1.0% by weight, based on the total weight of the electrode formulation; and the electrode active material is a lithium-nickel-manganese-cobalt composite oxide present in an amount between 93.5% by weight and 94.5% by weight, based on the total weight of the electrode formulation.

16. The positive electrode of claim 12, wherein the particles of the electrode formulation have a particle size distribution $D_{50}$ of between 14 microns and 6 microns.

17. The positive electrode of claim 12, wherein the particles of the electrode formulation have a particle size distribution $D_{50}$ of between 12 microns and 6 microns.

18. The positive electrode of claim 12, wherein the particles of the electrode formulation have a particle size distribution $D_{50}$ of between 10 microns and 6 microns.

* * * * *

UNITED STATES PATENT AND TRADEMARK OFFICE
CERTIFICATE OF CORRECTION

PATENT NO. : 10,014,518 B2
APPLICATION NO. : 14/057939
DATED : July 3, 2018
INVENTOR(S) : Junwei Jiang et al.

It is certified that error appears in the above-identified patent and that said Letters Patent is hereby corrected as shown below:

On the Title Page

In Item (72), under "Inventors", in Column 1, Line 3, delete "Kelkeim", and insert --Kelkheim--, therefor.

In Item (57), under "ABSTRACT", in Column 2, Line 3, delete "a electrode" and insert --an electrode--, therefor.

In the Specification

In Column 1, Line 41, delete "full hybrid systems" and insert --full hybrid electric vehicles--, therefor.

In Column 1, Line 44, delete "mild hybrid systems" and insert --mild hybrid electric vehicles--, therefor.

In Column 3, Line 23, delete "DRAWINGS" and insert --BRIEF DESCRIPTION OF DRAWINGS--, therefor.

In Column 4, Line 66, delete "xEV's" and insert --xEVs--, therefor.

In Column 5, Line 22, delete "xEV's," and insert --xEVs,--, therefor.

In Column 11, Lines 43-44, delete "hydroxlethylcellulose," and insert --hydroxyethylcellulose,--, therefor.

In Column 12, Line 5, delete "polyoxoethylenes" and insert --polyoxyethylenes--, therefor.

In Column 12, Line 7, delete "polyoxoethylenes" and insert --polyoxyethylenes--, therefor.

In Column 18, Line 30, delete "the a" and insert --the--, therefor.

Signed and Sealed this
Eleventh Day of December, 2018

Andrei Iancu
*Director of the United States Patent and Trademark Office*